No. 703,016. Patented June 24, 1902.
T. H. TASH.
VEHICLE AXLE NUT.
(Application filed June 1, 1901.)
(No Model.)
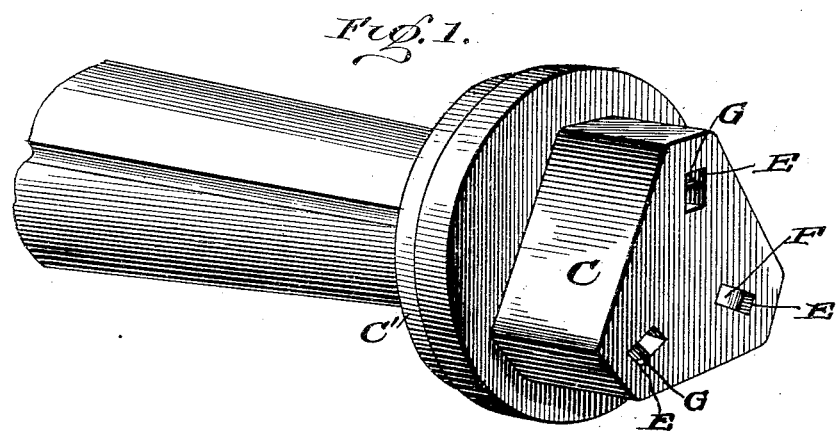
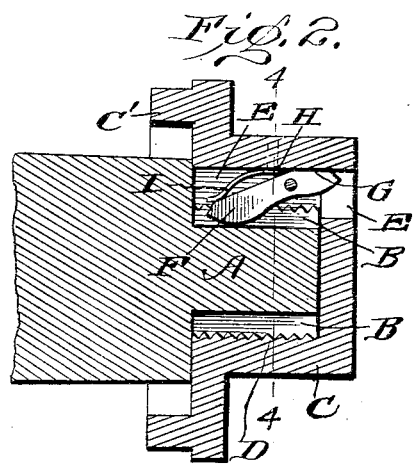
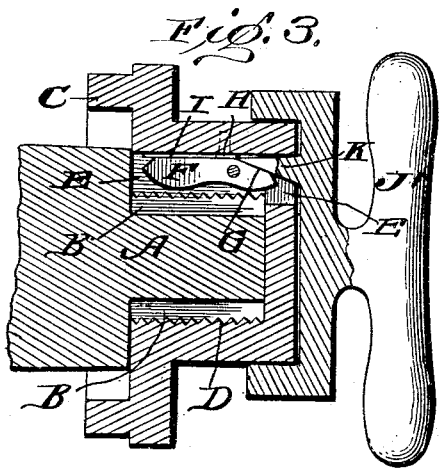
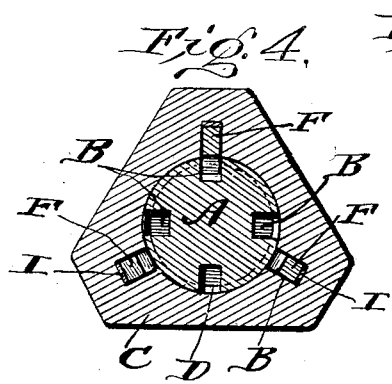
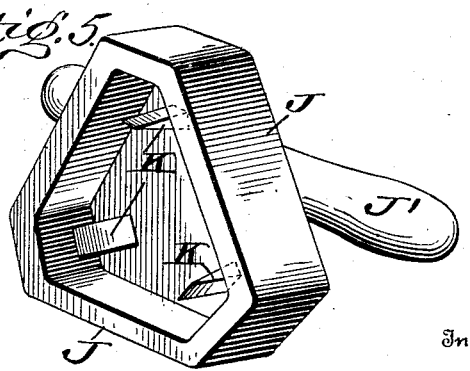
Witnesses
M. Blondell
Clarence Shaw
Inventor
T. H. Tash.
By O'Meara & Co.
Attorneys
THE NORRIS PETERS CO., PHOTO-LITHO., WASHINGTON, D. C.

UNITED STATES PATENT OFFICE.

THOMAS H. TASH, OF POTOMAC, ILLINOIS.

VEHICLE-AXLE NUT.

SPECIFICATION forming part of Letters Patent No. 703,016, dated June 24, 1902.

Application filed June 1, 1901. Serial No. 62,743. (No model.)

*To all whom it may concern:*

Be it known that I, THOMAS H. TASH, a citizen of the United States, residing at Potomac, in the county of Vermilion and State of Illinois, have invented a new and useful Vehicle-Axle Nut, of which the following is a specification.

This invention relates to improvements in nuts for vehicle-axles; and the object is to provide a simple construction of nut which will be positively prevented from becoming accidentally displaced from the axle and which may be conveniently positioned upon the axle and removed therefrom.

With the above object in view the invention consists in the novel features of construction hereinafter fully described, particularly pointed out in the claims, and clearly illustrated by the accompanying drawings, in which—

Figure 1 is a perspective view of a vehicle-axle nut embodying my invention, the same being shown in position upon the spindle of the axle; Fig. 2, a vertical longitudinal sectional view of the same; Fig. 3, a similar view with the device for positioning and removing the nut in position upon the nut. Fig. 4 is a detail transverse section on the line 4 4 of Fig. 2, and Fig. 5 is a perspective view of said device for removing the nut.

Referring now more particularly to the accompanying drawings, A designates the threaded end of the axle-spindle, formed about its circumference with a plurality of longitudinally-extending grooves B, preferably four in number and disposed at equidistant points.

C designates the nut, which is closed at its outer end and is provided with a centrally-screw-threaded passage D to receive the threaded portion A of the spindle and with radially-disposed grooves or pockets E opening into the central opening and disposed at equidistant points about the same. The nut may be of any desired external contour, it here being illustrated as triangular with the corners thereof flattened. The pockets or grooves, which are preferably three in number, are disposed at the corners of the triangular nut.

By providing the nut with a different number of grooves and springs than three grooves in the axle some one of the springs will be in position to engage with one of the grooves by a very slight rotation of the nut, thereby permitting of a very fine adjustment of the nut. With four springs and only three grooves it only requires one-twelfth of a rotation of the nut to bring some one of the springs into position to enter some one of the grooves in the axle.

Intermediately pivoted in each pocket is a dog F, having its outer end beveled slightly, as illustrated at G, to form a space between the end of the dog and the wall of the nut. Also positioned in each of said pockets and secured therein by a pin passed through an attaching portion H is a spring I, bearing against the inner end of the dog and holding said end normally downward and projecting into the central opening of the nut. The nut is formed on its rear face with flanges C', as illustrated.

The tool or device for positioning the device upon the spindle and removing the same therefrom comprises a cap J of the same shape as the nut and having flanges to fit over the latter. Said cap has on its inner face wedge-shaped lugs K, designed to extend into the pockets in the nut and by engagement with the inclined ends of the dogs F depress said ends and raise the inner ends out of the central opening of the nut. Thus the nut may be readily positioned upon the threaded portion of the spindle, and as soon as the cap is removed the springs force the inner ends of the dogs downwardly and the dog registering with one of the grooves will be forced therein and rotation of the nut is positively prevented. Therefore accidental displacement of the same from the spindle is positively avoided. After the nut has been screwed up nearly to the limit the wrench or tool is partially withdrawn to permit the inner ends of the dogs to engage with the spindle, so that as soon as any one of them reaches a groove it will automatically enter it and lock the nut against further rotation in either direction.

In practice I prefer to provide the cap with a handle J', by which the cap may be turned, thus avoiding the use of a wrench. The handle may be made integral with the cap, as shown, or, if desired, may be made of a separate piece and fastend to the cap in any suitable manner.

It will thus be readily understood that by providing the spindle with a series of grooves I am enabled to obtain a very fine adjustment, as the nut need be turned but a slight distance, when one of the dogs will drop into one of the grooves and securely lock the nut in place.

Having thus fully described my invention, what I claim as new, and desire to secure by Letters Patent, is—

1. The combination, with a vehicle-nut provided with an interior longitudinal groove, of a spring-pressed dog pivoted within said groove, the outer end of the dog being cut off to form a space between it and the wall of the nut for the insertion of an operating tool or wrench.

2. The combination, with a vehicle-nut provided with an interior longitudinal groove, of a dog pivoted intermediate its length therein, the forward end of the dog being cut off to form a space between it and the wall of the nut, for the insertion of an operating tool or wrench, and a spring in engagement with the inner end of the dog to force it toward the interior of the nut.

3. The combination, with a vehicle-nut provided with a series of interior longitudinal grooves, of a spring-pressed dog in each groove, the inner end of which is adapted to engage with the axle and the outer end is cut off to form a space between the end of the dog and the wall of the nut, for the insertion of an operating tool or wrench.

4. The combination, with an axle provided with a series of longitudinal grooves, of a nut provided with a series of interior longitudinal grooves, the number of the grooves in the nut differing from those in the axle, and a catch mounted in each groove in the nut in position to enter the groove in the axle.

5. The combination, with an axle provided with four longitudinal grooves, of a triangular nut provided with three interior longitudinal grooves, one at each angle of the nut, and a catch mounted in each groove in the nut in position to enter some one of the grooves in the axle when the nut is rotated.

6. The combination, with an axle provided with a longitudinally-grooved axle, of a substantially cup-shaped nut, the bottom of which is perforated for the insertion of an operating-tool and the interior is provided with an interior longitudinal groove to register with each perforation, and a spring-pressed catch in each groove, the outer end of which is cut off to form a space between it and the bottom of the groove, for the insertion of an operating tool or wrench.

THOMAS H. TASH.

Witnesses:
H. S. COPELAND,
L. C. MESSNER.